United States Patent
Inoue et al.

(10) Patent No.: US 6,822,237 B2
(45) Date of Patent: Nov. 23, 2004

(54) GAMMA CAMERA APPARATUS

(75) Inventors: Tomio Inoue, Takasaki (JP); Tadashi Ito, Kiryu (JP); Masao Jimbo, Otawara (JP); Kenzo Eguchi, Machida (JP); Katsuroh Ohwadano, Tokyo (JP)

(73) Assignee: Anzai Medical Kabushiki Kaisha, Tokyo (JP)

( * ) Notice: Subject to any disclaimer, the term of this patent is extended or adjusted under 35 U.S.C. 154(b) by 377 days.

(21) Appl. No.: 09/892,855

(22) Filed: Jun. 28, 2001

(65) Prior Publication Data

US 2002/0145114 A1 Oct. 10, 2002

(30) Foreign Application Priority Data

Feb. 28, 2001 (JP) .......................................... 2001-054354
Jun. 18, 2001 (JP) .......................................... 2001-183156

(51) Int. Cl.$^7$ .............................................. G01T 1/164
(52) U.S. Cl. ............................. 250/363.06; 250/370.09; 250/370.11; 250/370.13
(58) Field of Search ....................... 250/363.06, 370.09, 250/370.11, 370.13

(56) References Cited

U.S. PATENT DOCUMENTS

| | | | | |
|---|---|---|---|---|
| 4,435,838 A | * | 3/1984 | Gourlay | 382/312 |
| 4,891,844 A | * | 1/1990 | Kiri | 382/132 |
| 4,977,505 A | * | 12/1990 | Pelizzari et al. | 600/425 |
| 5,600,144 A | * | 2/1997 | Worstell | 250/363.03 |
| 5,672,877 A | * | 9/1997 | Liebig et al. | 250/363.04 |
| 6,392,235 B1 | * | 5/2002 | Barrett et al. | 250/363.06 |
| 2003/0150996 A1 | * | 8/2003 | Ito et al. | 250/370.09 |

OTHER PUBLICATIONS

Sadao Fujimura et al., "Coded Aperture Emmission CT using M–Array", Transactions of the Society of Instrument and Control Engineers, vol. 28, No. 4, 426/432 (1992).

Tadashi Ito et al., "Three dimensional reconstruction of $^{99m}$Tc distribution by using coded aperture CT", Instrument Department of the Society of Instrument and Control Engineers, 17th Sensing Forum, Oct. 12, 2000. pp. 31–36.

* cited by examiner

*Primary Examiner*—Constantine Hannaher
*Assistant Examiner*—Shun Lee
(74) *Attorney, Agent, or Firm*—Paul A. Guss

(57) ABSTRACT

After the position of a collimator with respect to a gamma camera depending on the position of a detection plane in an examinee, gamma rays radiated from the examinee are detected by a scintillation detector via a collimator and a scintillator, and a signal from the scintillation detector is processed by a signal processing circuit and then transferred to an image reconstructing unit, which reconstructs a three-dimensional image of the radiation source in the examinee and displays the three-dimensional image on a display unit.

17 Claims, 13 Drawing Sheets

GAMMA CAMERA APPARATUS

BACKGROUND OF THE INVENTION

1. Field of the Invention

The present invention relates to a gamma camera apparatus for detecting gamma rays emitted from a radioisotope (RI) administered to an examinee to construct a three-dimensional image representing a distribution of the radioisotope in the examinee.

2. Description of the Related Art

Apparatus based on a combination of a radiation detector and a computer for producing images representing internal information of examinees are widely used in the medical field, for example. One typical apparatus is an X-ray CT (computerized tomography) apparatus which comprises a radiation source and a radiation detector that are disposed in confronting relation to each other and rotated around an examinee to scan the examinee, and a processor for measuring and processing absorbed values of X rays that are transmitted from the radiation source through the examinee to the radiation detector to obtain a sectional image of the examinee from the absorbed values.

The X-ray CT apparatus, however, is large in size and expensive to manufacture because of the structure that rotates the radiation source and the radiation detector around the examinee.

There have recently been developed gamma camera apparatus for detecting gamma rays emitted from a radioisotope administered to an examinee with a plurality of detectors arranged in a plane and a scintillator, and reconstructing internal information of the examinee based on the detected gamma rays.

One gamma camera apparatus that has been proposed has a encoding aperture plate having a number of apertures defined therein according to given rules and disposed in front of a scintillator, and reconstructs internal information of an examinee based on the information obtained from the encoding aperture plate. For details, reference should be made to "Encoding aperture radiation-type CT using M array", Transactions of the Society of Instrument and Control Engineers, Vol. 28, No. 4,426/432 (1992), and "Reconstruction of three-dimensional distribution of $^{99m}$Tc using encoding aperture CT", Instrument department of the Society of Instrument and Control Engineers, 17th sensing forum (2000).

SUMMARY OF THE INVENTION

It is a general object of the present invention to provide a gamma camera apparatus which is capable of obtaining a high-resolution image representing internal information of an examinee.

A major object of the present invention is to provide a gamma camera apparatus which is capable of obtaining three-dimensional image information of an examinee with a simple arrangement.

Another object of the present invention is to provide a gamma camera apparatus which is of a small size.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
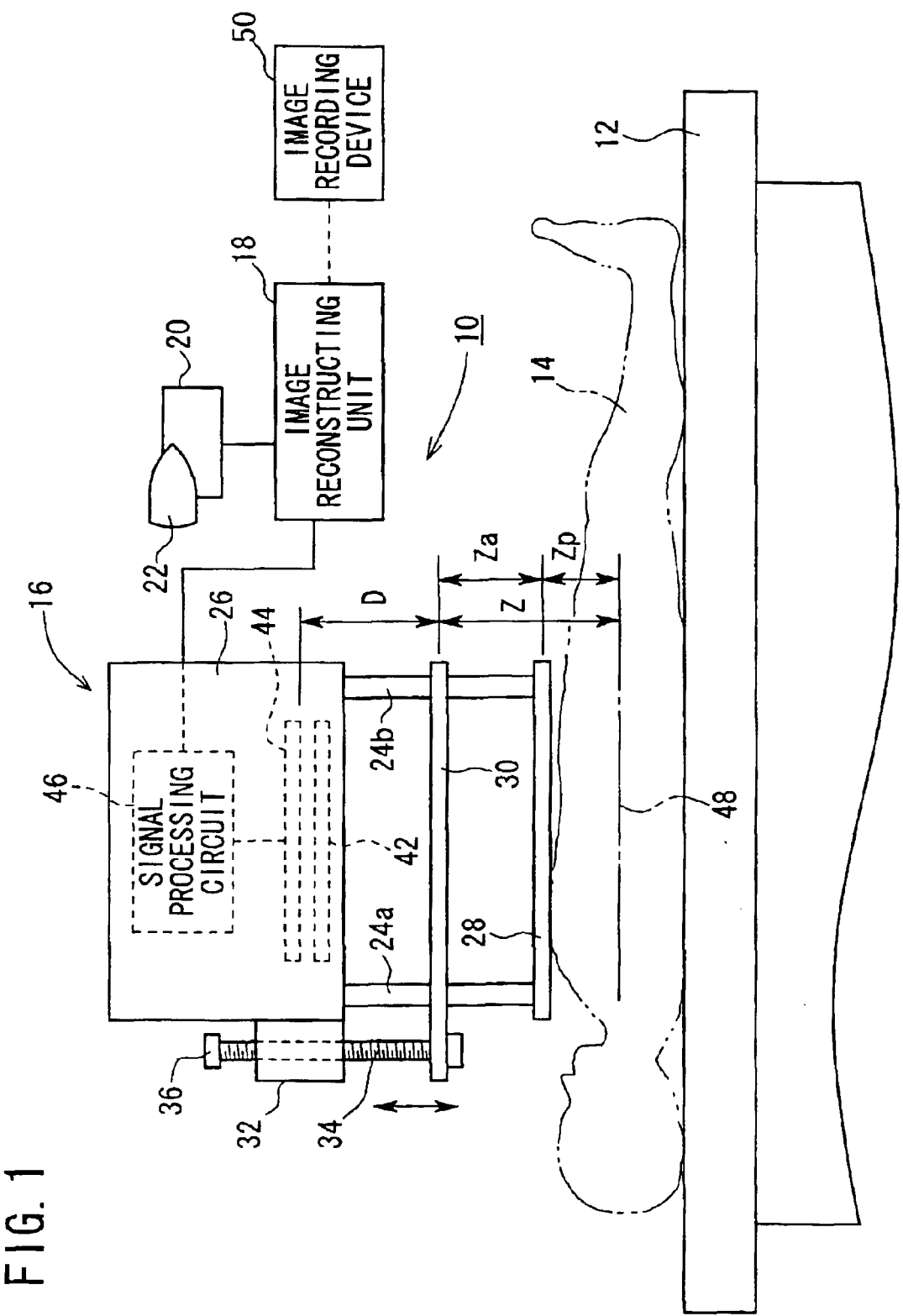
FIG. 1 is an elevational view, partly in block form, of a gamma camera apparatus according to the present invention.

FIG. 1 shows a gamma camera apparatus 10 according to the present invention. As shown in FIG. 1, the gamma camera apparatus 10 basically comprises a gamma camera 16 for detecting gamma rays radiated from an examinee 14 lying on a bed 12 and an image reconstructing unit 18 (image reconstructing means) for reconstructing a three-dimensional image of the examinee 14 based on gamma rays detected by the gamma camera 16. The image reconstructing unit 18 comprises a personal computer, for example, and has a keyboard 20 for entering data to control the gamma camera 16 and a display unit 22 (image display means) for displaying a reconstructed three-dimensional image.

The gamma camera 16 has a main camera unit 26, a plate 28 supported on the main camera unit 26 by a pair of guide bars 24a, 24b for keeping the main camera unit 26 spaced a certain distance from the examinee 14, and a collimator 30 (encoding aperture plate) disposed between the main camera unit 26 and the plate 28. A screw 34 is threaded through a nut 32 mounted on the main camera unit 26 and has a lower end rotatably coupled to the collimator 30. The collimator 30 can be displaced between the main camera unit 26 and the plate 28 when a knob 36 (adjusting means) fixed to the other end of the screw 34 is turned. The plate 28 may be made of any of various materials insofar as it can pass gamma rays radiated from the examinee 14 to the main camera unit 26.

Figure 2:
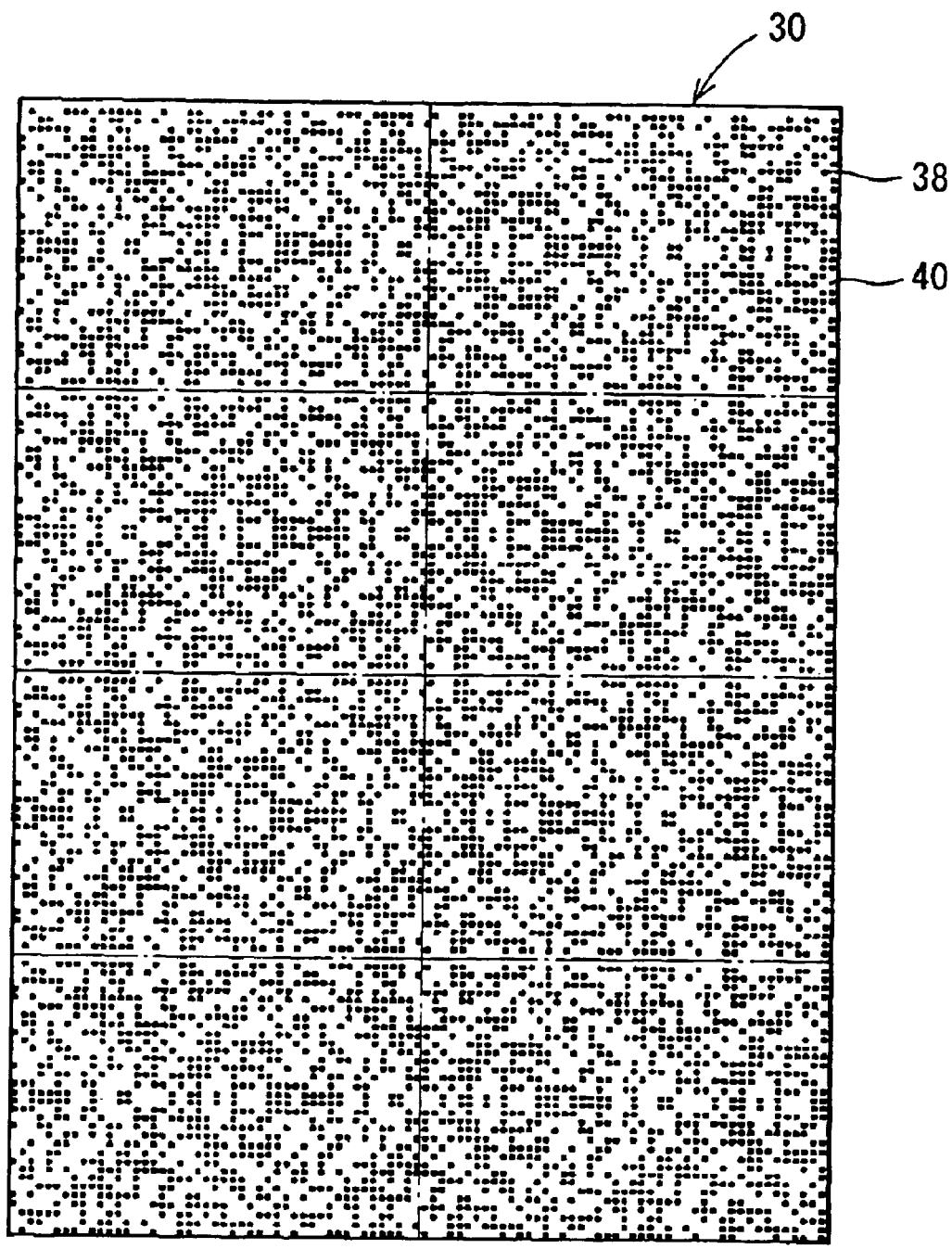
FIG. 2 is a view showing M array apertures defined in a collimator in the gamma camera apparatus.

As shown in FIG. 2, the collimator 30 has a number of pinhole apertures 38 defined therein in a predetermined periodic pattern 40 according to an M array. The M array is a two-dimensional array of apertures 38 whose intervals are established according to the rules of an M sequence that is a pseudo-random sequence. The M array has an autocorrelation function close to a δ function and has constant correlation function values other than a peak. Alternatively, the collimator 30 may have a one-dimensional array of apertures 38 defined according to the rules of the M sequence.

The main camera unit 26 of the gamma camera 16 comprises a scintillator 42 for emitting fluorescence upon exposure gamma rays radiated from the examinee 14, a scintillation detector 44 (detecting means) for detecting fluorescence and converting the detected fluorescence into an electric signal corresponding to a count of gamma rays, and a signal processing circuit 46 for transferring position-dependent count data from the scintillation detector 44 to the image reconstructing unit 18.

The collimator 30, the scintillator 42, and the scintillation detector 44 lie parallel to each other. The scintillation detector 44 that is disposed closely to the scintillator 42 may comprise a position-sensitive photomultiplier or a one- or two-dimensional array of photodiodes. If the scintillation detector 44 comprises a position-sensitive photomultiplier or a one-dimensional array of photodiodes, then each of the collimator 30 and the scintillator 42 is also in the shape of a one-dimensional array, and the gamma camera 16 is scanned in a direction perpendicular to the arrays of the collimator 30 and the scintillator 42. Detected data from the gamma camera 16 are processed to provide information similar to information which is obtained if the scintillation detector 44, the collimator 30, and the scintillator 42 are in the shape of a two-dimensional array.

The position-sensitive photomultiplier and the scintillator 42 may be interconnected by optical fibers to efficiently guide light from the scintillator 42 to the position-sensitive photomultiplier.

The scintillator 42 may be made of a material selected from NaI:Tl, CsI:Na, LuSiO$_5$:Ce(LSO), (Lu$_{1-x}$Gd$_x$)SiO$_5$:Ce (LGSO), YAlO$_3$, etc.

The scintillator 42 and the scintillation detector 44 may be replaced with a semiconductor detecting device which is capable of obtaining an electric signal directly from gamma rays. The semiconductor detecting device may be made of CdTe, CdZnTe, or the like. The semiconductor detecting device may comprise a one- or two-dimensional array of semiconductor detecting elements.

The gamma camera apparatus 10 is basically constructed as described above. The principles of operation and advantageous effects of the gamma camera apparatus 10 will be described below.

The principles of a process of counting gamma rays radiated from the examinee 14 to reconstruct of an internal image of the examinee 14 will first be described below.

Figure 3:
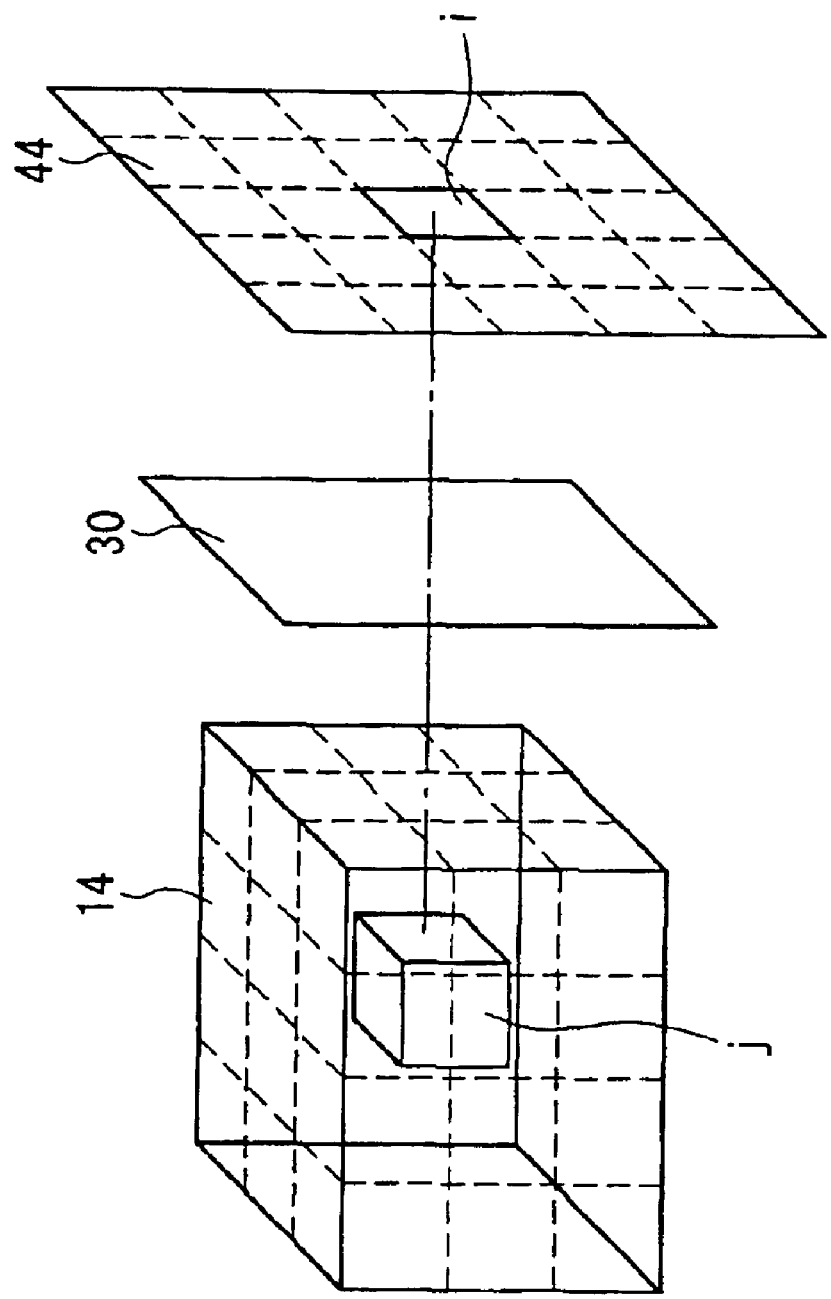
FIG. 3 is a perspective view illustrative of the principles of the gamma camera apparatus.

In FIG. 3, the examinee 14 in which a radiation source for emitting gamma rays can be present is divided into n voxels, one of which is represented by j (j=1, 2, . . . , n), and the scintillation detector 44 for detecting gamma rays has m pixels, one of which is represented by i (i=1, 2, . . . , m).

It is assumed that an expected value of the count of gamma rays emitted from the jth voxel in a certain time is represented by $S_j$, an expected value of the count of gamma rays detected by the ith pixel in a certain time is represented by $P_i$, and a count of actually detected gamma rays is represented by $P^*_i$. If the probability that gamma rays emitted from the voxel j are detected by the pixel i is represented by $f_{ij}$, then the following equation is satisfied:

$$P_i = \sum_{j=1}^{n} f_{ij} S_j \quad (i = 1, 2, \cdots, m) \qquad (1)$$

Since the count of gamma rays emitted from the radiation source varies at random according to the Poisson distribution, the count detected by the pixel i of the scintillation detector 44 also varies at random, and its expected value $P_i$ is given by the equation (1).

The probability $f_{ij}$ is geometrically determined by the positional relationship of the voxel j, the pixel i, and the apertures 38 of the collimator 30 and the M array that is the arrayed pattern of the apertures 38. However, since it is difficult to strictly calculate the value of the probability $f_{ij}$ because of a large amount of calculations involved even under ideal conditions free of absorption and scattering of gamma rays, the value of the probability $f_{ij}$ is actually determined on the assumption that the radiation source distribution in the voxel is represented by a point radiation source at the center of the voxel.

Specifically, a path of gamma rays emitted from the voxel j and reaching the pixel i is of a conical shape whose vertex is positioned at the center of the voxel j and bottom at the pixel i. If the vertex of the conical shape has a solid angle Ω and the ratio of the area of the apertures 38 to the area of the collimator 30 which is intersected by the conical shape (geometric-optical transmittance) is represented by τ, then the probability $f_{ij}$ is given as:

$$f_{ij} = (\Omega/4\pi) \cdot \tau \qquad (2)$$

If the pixel is small compared with the voxel, a conical shape may be constructed which has a vertex positioned at the center of the pixel and a bottom held in contact with the voxel, and the probability $f_{ij}$ can be determined more accurately from such a conical shape.

If the distribution of the radiation source is represented by $S=(S_1, S_2, \ldots, S_n)$ and the count of gamma rays by $P^*=(P^*_1, P^*_2, \ldots, P^*_m)$, then a conditional probability (likelihood) Prob($P^*|S$) that the count $P^*$ is obtained under the condition that the distribution S is observed is expressed by the following equation (3) using the formula of the Poisson distribution and the equation (1):

$$Prob(P*|S) = \prod_{i=1}^{m} (P_i \char`\^ P_i^* / P_i^* !) \cdot \exp(-P_i) \qquad (3)$$

where "^" represents a power.

The image reconstructing unit 18 asymptotically determines a radiation source distribution S where the conditional probability (likelihood) Prob($P^*|S$) according to the equation (3) is maximum.

Figure 4:
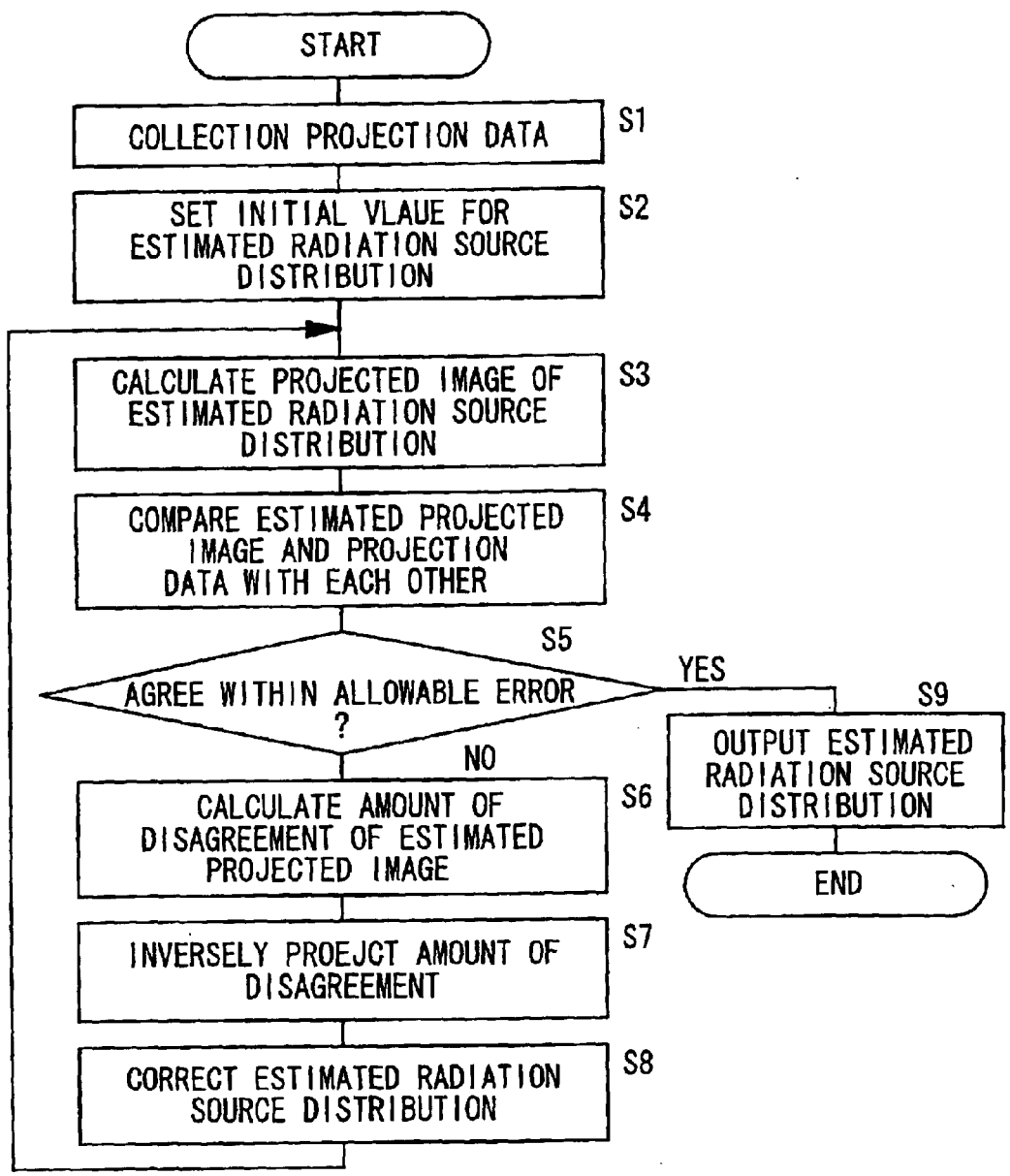
FIG. 4 is a flowchart of an image reconstructing process carried out by the gamma camera apparatus.

FIG. 4 is a flowchart of a specific process carried out by the image reconstructing unit 18 for determining the radiation source distribution S using the equation (3).

First, gamma rays emitted from the radioisotope administered to the examinee 14 are detected by the collimator 30 and the scintillator 42, thus collecting a count $P^*$ representing projection data of the radiation source in step S1. Then, an initial value for the radiation source distribution S is set in step S2, and thereafter an expected value $P(P_1, P_2, \ldots P_m)$ which indicates an estimated projected image of the radiation source is calculated in step S3. The initial value for the distribution S of the estimated radiation source can be set so as to have a uniform distribution, for example.

Then, the expected value P determined as indicating the estimated projected image in step S3 and the count P* which represents protection data collected in step S1 are compared with each other in step S4. It is then determined in step S5 whether the expected value P and the count P* agree with each other within an allowable error. If the expected value P and the count P* do not agree with each other within the allowable error, then an amount of disagreement P*/P of the estimated projected image is calculated in step S6. The amount of disagreement P*/P is then inversely projected onto the examinee 14 in step S7, and the distribution S of the estimated radiation source is corrected in step S8.

The processing in steps S3 through S8 is repeated to bring the estimated value P asymptotically closely to the count P*. If the expected value P and the count P* agree with each other within the allowable error, then an image is reconstructed on the display unit 22 based on the distribution S of the estimated radiation source at the time in step S9.

The gamma camera apparatus 10 according to the present invention is capable of obtaining a high-resolution estimated projected image of the examinee 14 by adjusting the position of the collimator 30.

Figure 5:
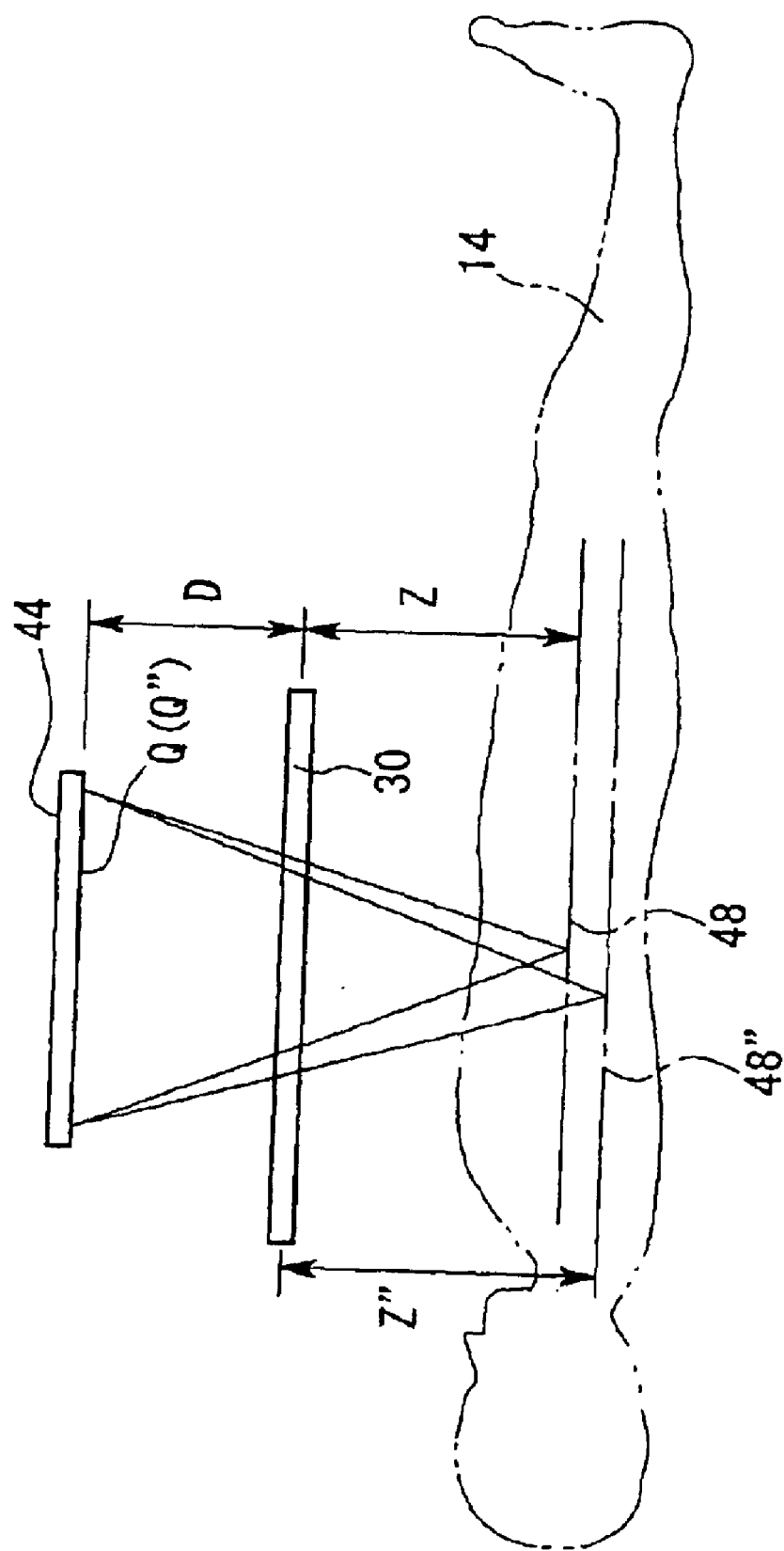
FIG. 5 is a view illustrative of a process of obtaining a three-dimensional image with the gamma camera apparatus.
Figure 6:
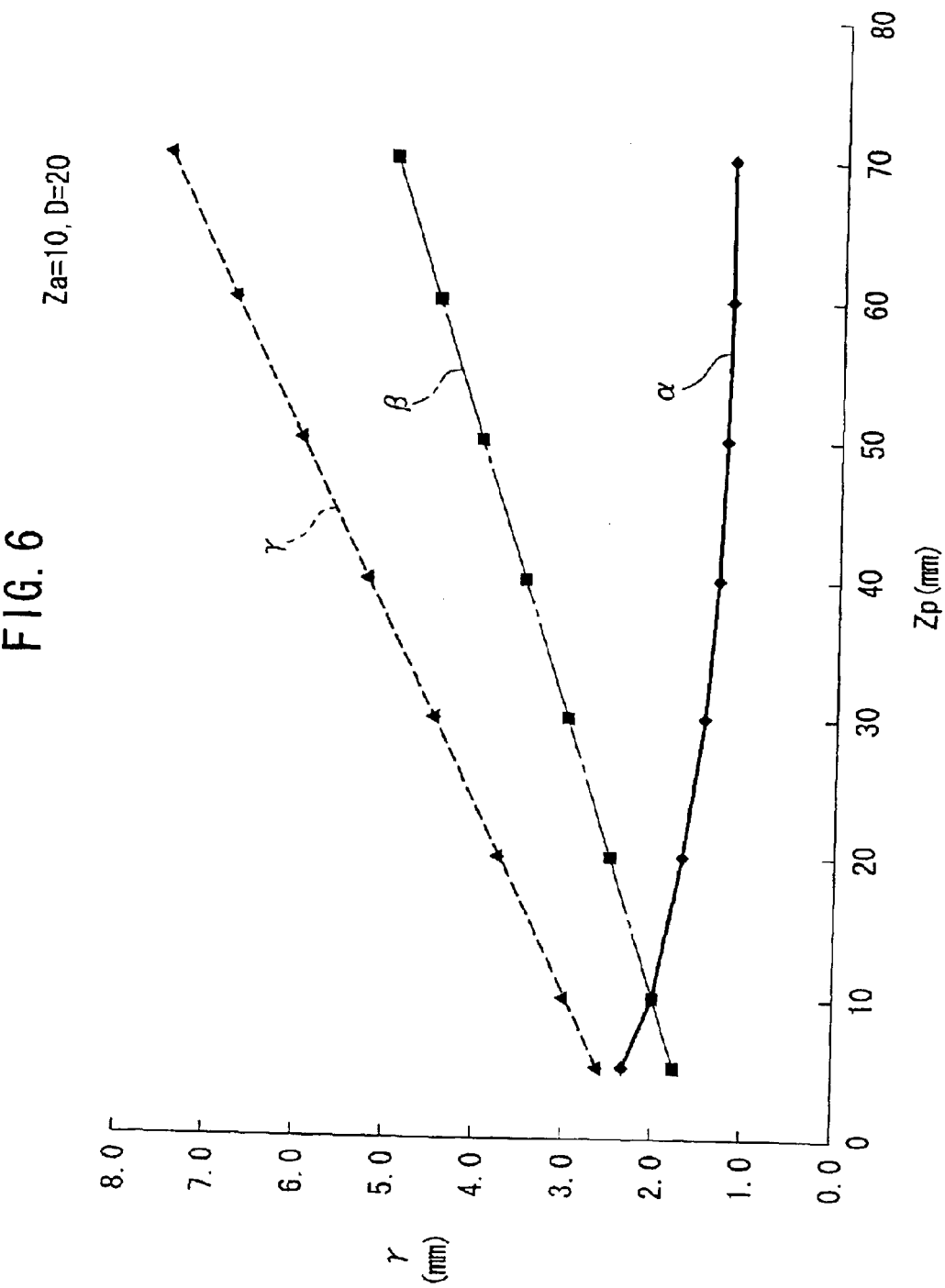
FIG. 6 is a graph of experimental data representing the relationship between the position of the collimator and the resolution in the gamma camera apparatus.
Figure 7:
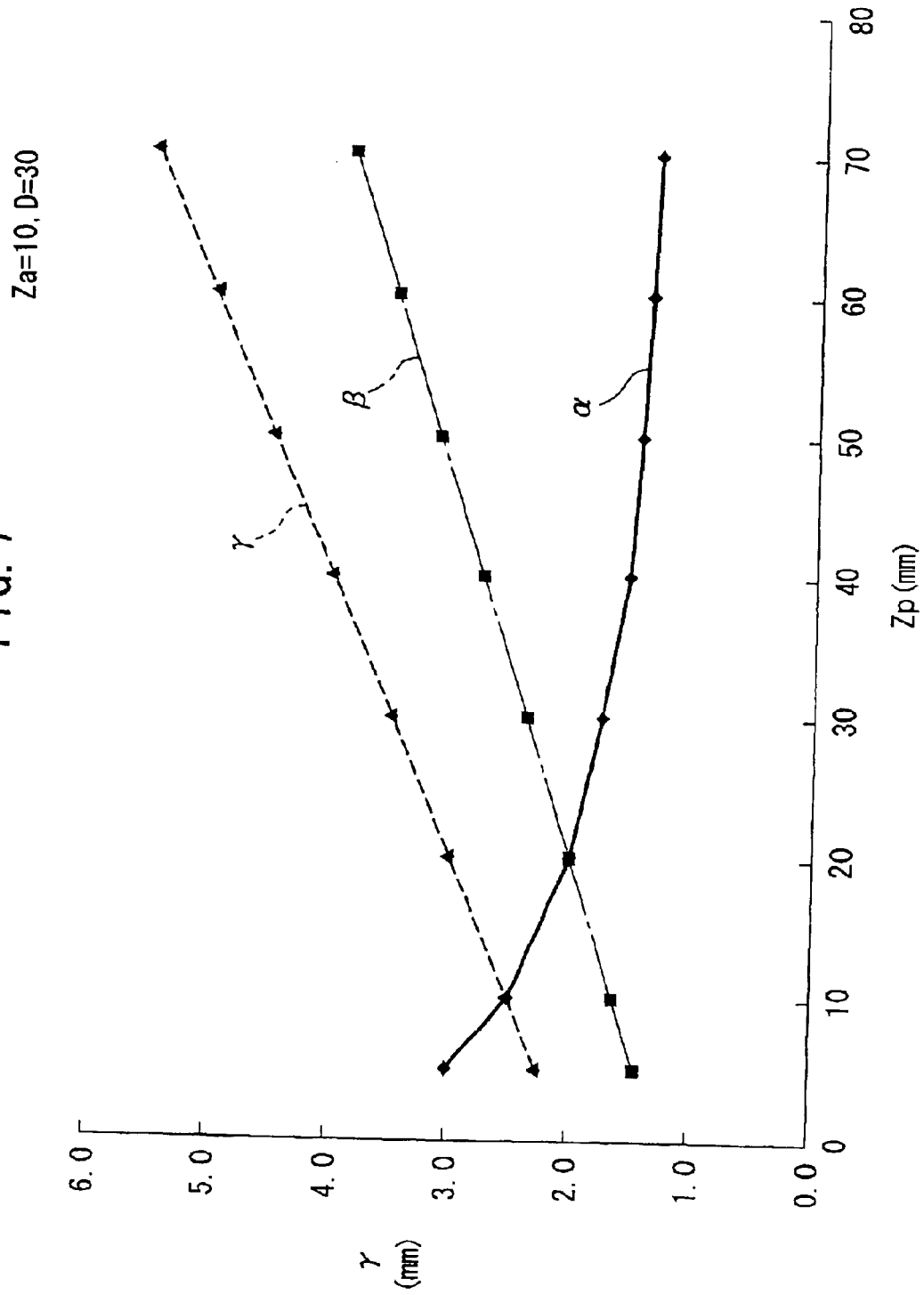
FIG. 7 is a graph of other experimental data representing the relationship between the position of the collimator and the resolution in the gamma camera apparatus.
Figure 8:
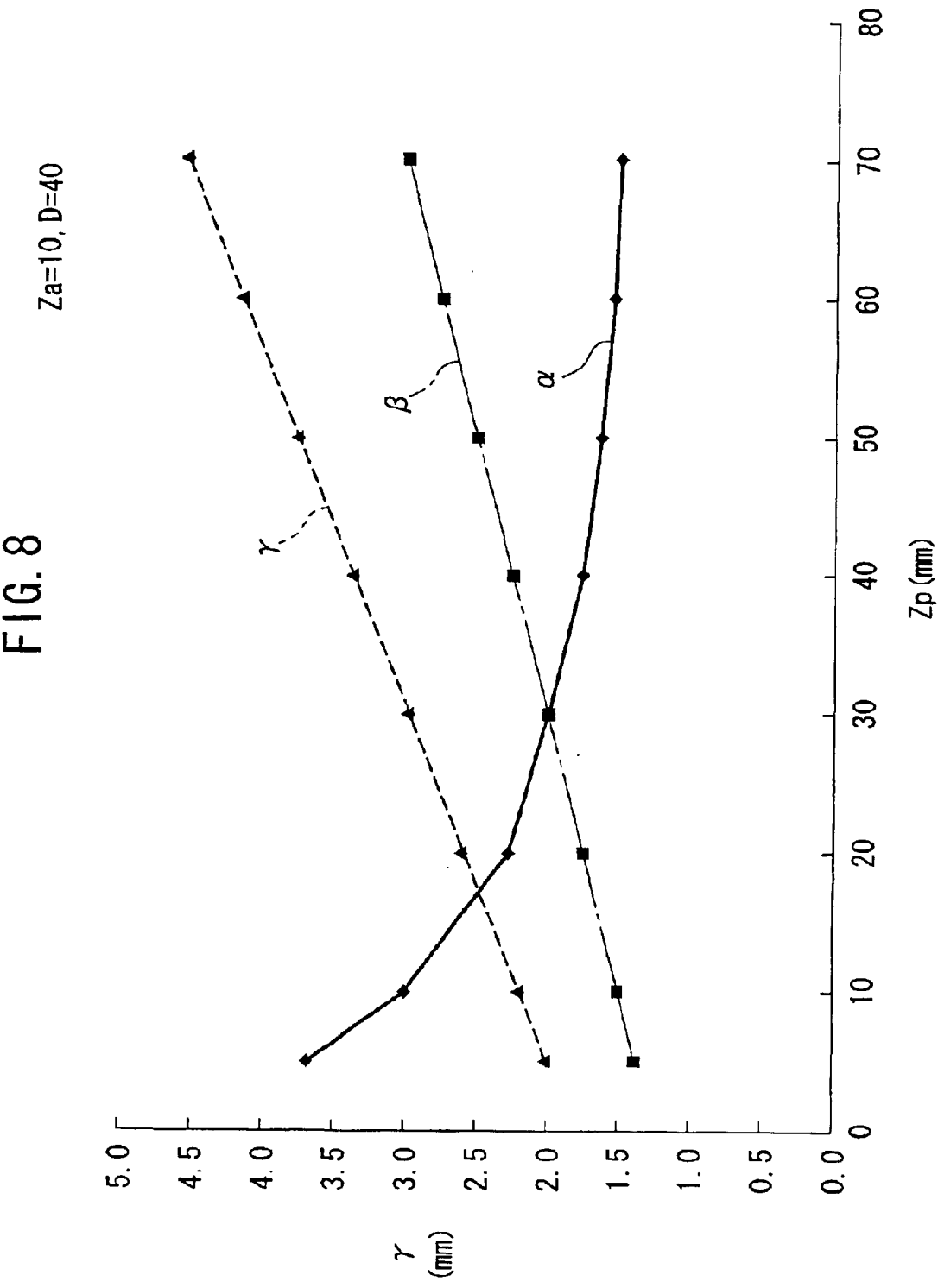
FIG. 8 is a graph of still other experimental data representing the relationship between the position of the collimator and the resolution in the gamma camera apparatus.
Figure 9:
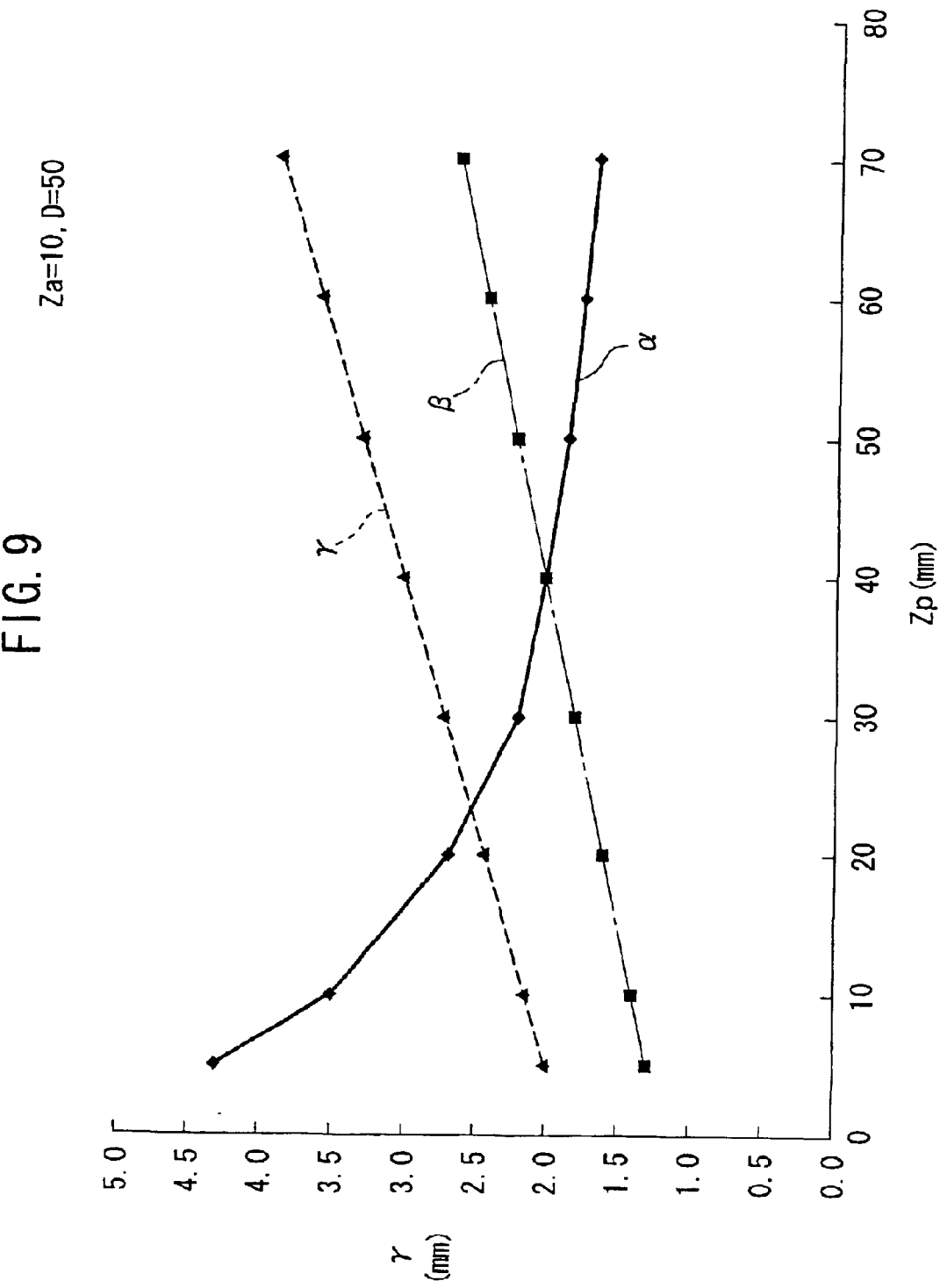
FIG. 9 is a graph of yet other experimental data representing the relationship between the position of the collimator and the resolution in the gamma camera apparatus.
Figure 10:
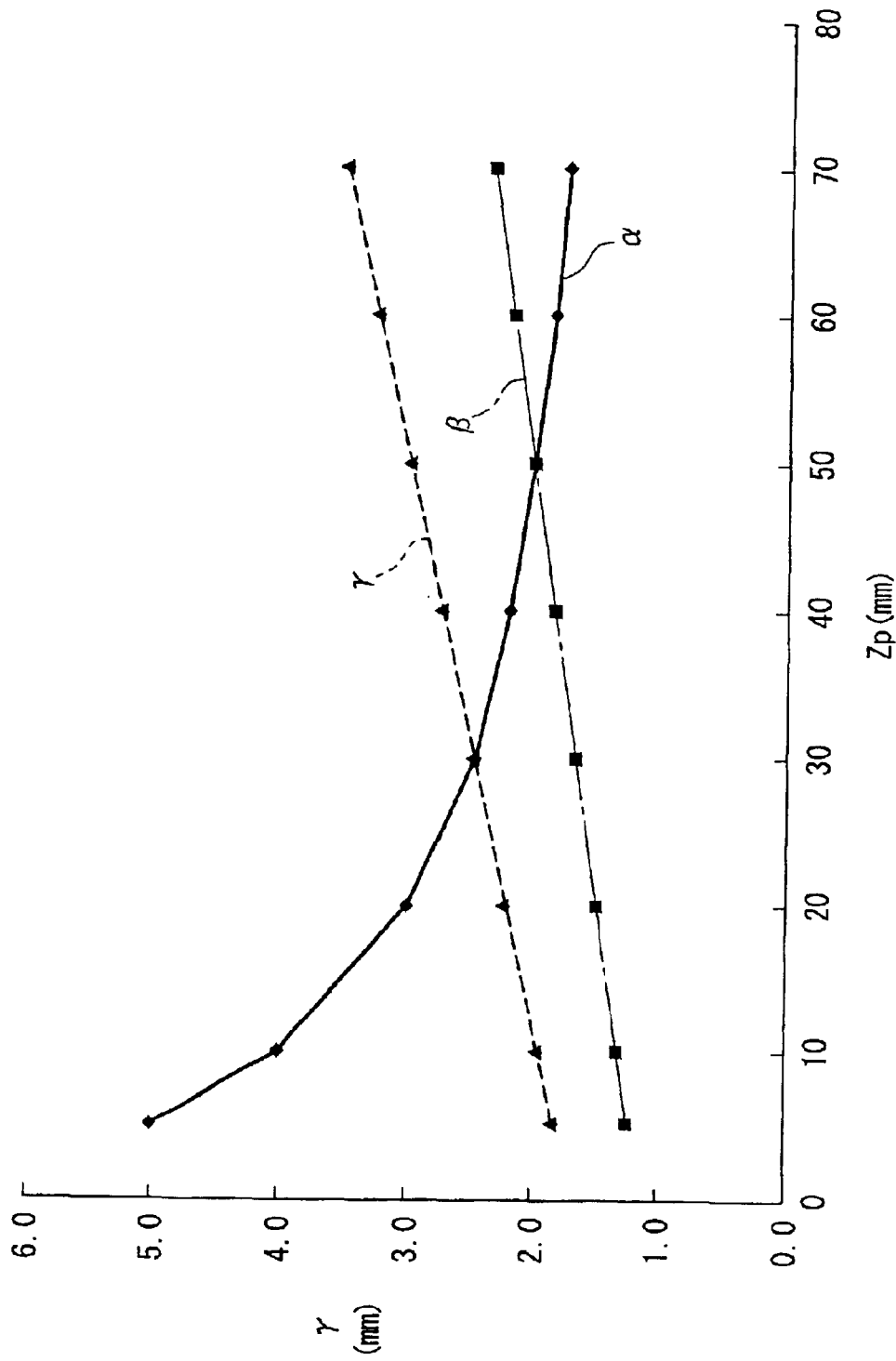
FIG. 10 is a graph of still yet other experimental data representing the relationship between the position of the collimator and the resolution in the gamma camera apparatus.

Specifically, if the distance between the scintillation detector 44 and the collimator 30 is represented by D and the distance between the collimator 30 and a detection plane 48 of the examinee 14 is represented by Z, then the scintillation detector 44 forms a projected image Q enlarged by the collimator 30 at an enlargement ratio $\alpha=(D+Z)/Z$ with the radiation from a point radiation source on the detection plane 48 (see FIG. 5). Similarly, a projected image Q' translated on the scintillation detector 44 from the projected image Q is formed with the radiation from another point radiation source on the detection plane 48. The radiation from a detection plane 48" in the examinee 14 at a different distance Z" from the collimator 30 forms a projected image Q" enlarged by the collimator 30 at an enlargement ratio $\alpha"=(D+Z")/Z"$ on the scintillation detector 44.

Therefore, the projected image formed on the scintillation detector 44 includes information of the position in the detection plane 48 (48") of the point radiation source as the amount of translation, and also includes information of the depth of the detection plane 48 (48") as the enlargement ratio. In general cases where the radiation source is distributed in a certain extent, the projected image thereof can be obtained as a superposition of projected images of point radiation sources.

Since the collimator 30 has a plurality of apertures 38 arrayed according to the M array, the autocorrelation function with the integration range being represented by one period has a sharp peak at its origin. Thus, by using an integral multiple of the period of the M array as the integration range, the correlation coefficient of the projected images Q, Q' becomes 0, and the projected images Q, Q' can be separated from each other.

As shown in FIG. 2, the apertures 38 of the collimator 30 are defined in the periodic pattern 40. Therefore, the point radiation sources on the same detection plane 48 (48") form projected images of the M array in a certain number of periods. The projected images Q, Q" of the point radiation sources at the different distances Z, Z" have different enlargement ratios $\alpha$, $\alpha"$, and have a small correlation function. Therefore, it is understood that the M array whose autocorrelation function has a sharp peak at the origin and which is a periodic pattern is excellent as the array of the apertures 38 of the collimator 30. If the length of the period of the periodic array of the apertures 38 is represented by L, then point radiation sources spaced by a distance $V=L\cdot(D+Z)/Z$ at the distance Z product exactly the same projected images. Consequently, the observation range for the detection plane 48 (48") in the examinee 14 must be located within the distance V.

As shown in FIG. 1, when the operator of the gamma camera apparatus 10 turns the knob 36, the position of the collimator 30 can be adjusted by the screw 34. When the position of the collimator 30 is adjusted, the enlargement ratio of the projected image formed on the scintillation detector 44 is varied, and hence the distance V for determining the resolution of the projected image is also varied. Accordingly, by suitably setting the position of the collimator 30 which determines the distance V, the gamma camera apparatus 10 can obtain a high-resolution projected image depending on the position of the detection plane 48.

FIGS. 6 through 10 show experimental data representing the relationship between an enlargement ratio $\alpha=(D+Z)/Z$ as viewed from the examinee 14, an enlargement ratio $\beta=(D+Z)/D$ as viewed from the scintillation detector 44, and a resolution $\gamma=p\cdot\beta$ (p: an average pitch between the apertures 38 of the collimator 30, p=1.5 mm in the experiment) at the detection plate 48 in the examinee 14 when the distance Za between the collimator 30 and the plate 28 was fixedly set to Za=10 and the distance D between the scintillation detector 44 and the collimator 30 is set to D=20, 30, 40, 50, 60. In FIGS. 6 through 10, the horizontal axis represents the distance Zp between the plate 28 and the detection plane 48, and the vertical axis represents the resolution $\gamma$.

The experimental data show that as the distance (depth) Zp of the detection plane 48 from the surface of the examinee 14 increases, the enlargement ratio $\alpha$ decreases and the enlargement ratio $\beta$ increases, and that these enlargement ratios $\alpha$, $\beta$ agree with each other at the resolution $\gamma=3$ mm. By adjusting the position of the collimator 30 insofar as the difference between the enlargement ratios $\alpha$, $\beta$ is not large, it is possible to obtain projected images of highly accurate resolution. It is preferable that the enlargement ratio $\alpha$ be in the range from 1.5 to 3.5

As described above, the gamma camera apparatus 10 can obtain projected images of optimum resolution. An obtained projected image of the detection plane 48 is displayed as a sectional image of the examinee 14 at the detection plane 48 (48") on the display unit 22. A three-dimensional image can be produced by combining sectional images obtained from a plurality of detection planes 48 (48").

A more accurate three-dimensional image of the examinee 14 can be reconstructed by processing data that are generated by imaging the examinee 14 with the gamma camera 16 in a plurality of different directions.

A more accurate three-dimensional image of the examinee 14 can also be reconstructed by processing data that are generated by imaging the examinee 14 with the gamma camera 16 at a plurality of different enlargement ratios.

As shown in FIG. 1, an image recording device 50 (image supply means) may be connected to the image reconstructing unit 18, and the projected image may be displayed on the display unit 22 in overlapping relation to an image supplied from the image recording device 50 to allow the operator to make a more accurate analysis of the image of the detection plane 48. The image recording device 50 may comprise a CT diagnostic device, a nuclear medicine diagnostic device, an MR (magnetic resonance) diagnostic device, a digital camera device, or the like.

Figure 11:
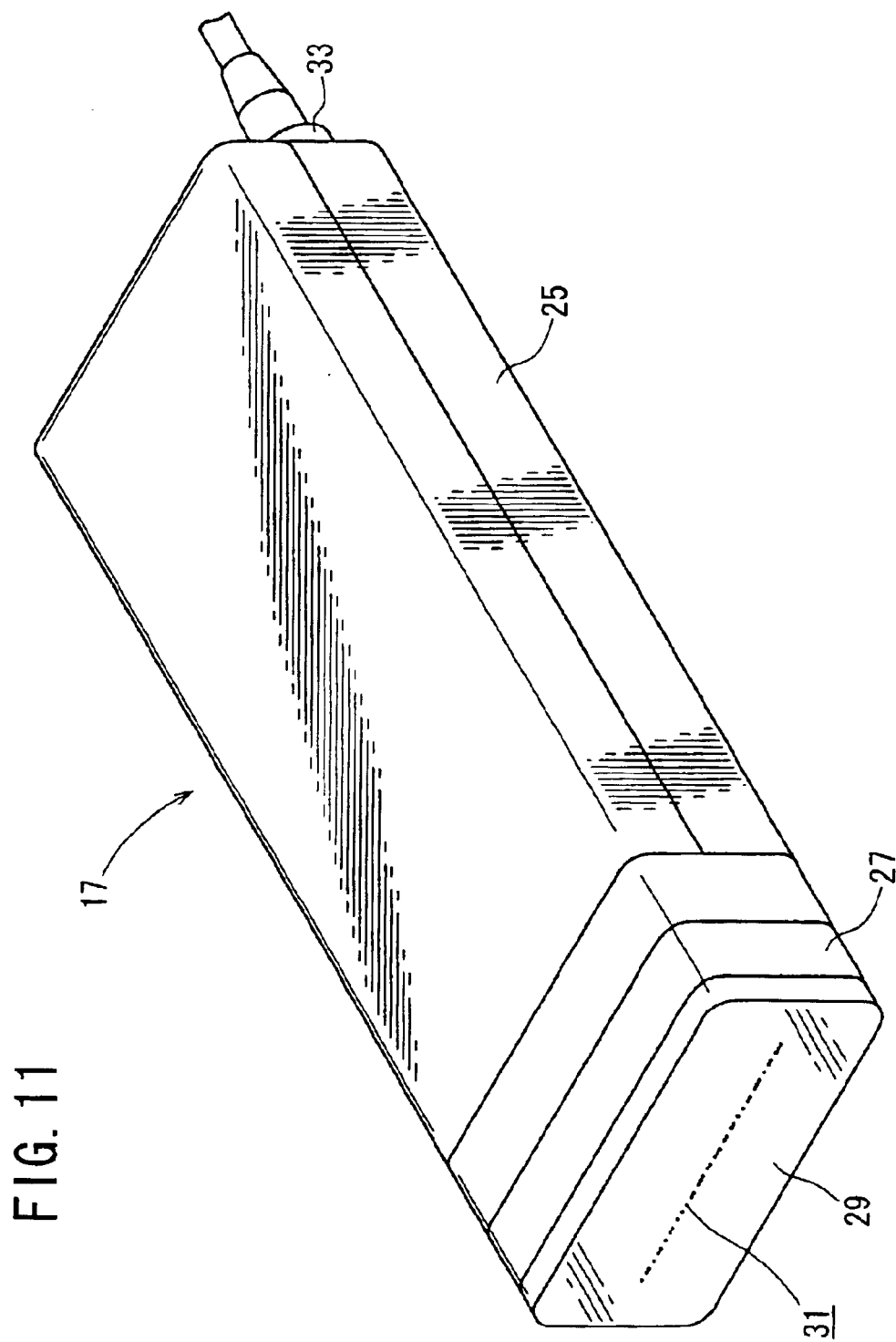
FIG. 11 is a perspective view of the gamma camera apparatus having a one-dimensional array of semiconductor detecting elements.
Figure 12:
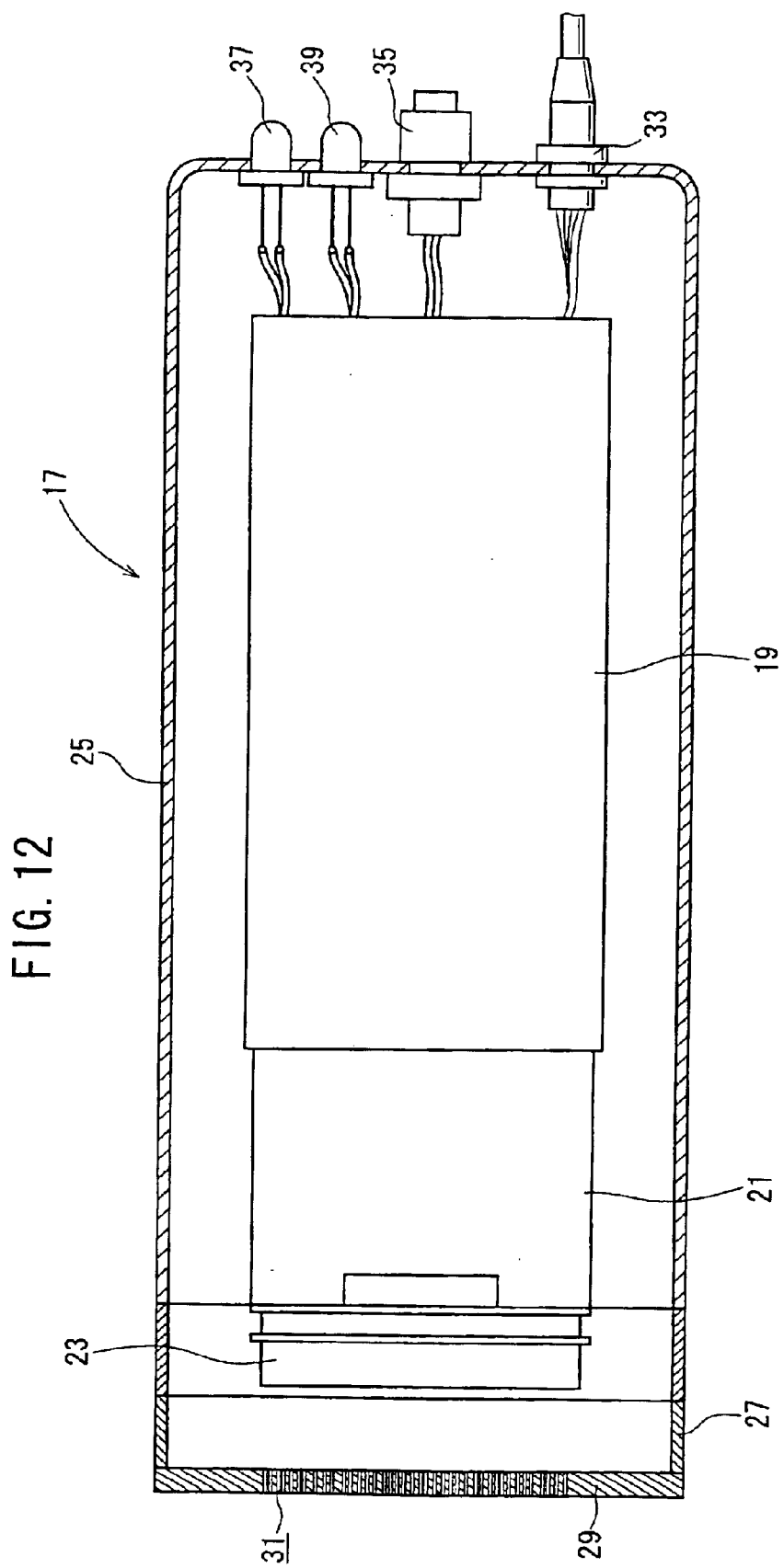
FIG. 12 is a transverse sectional view of the gamma camera apparatus having the one-dimensional array of semiconductor detecting elements.
Figure 13:
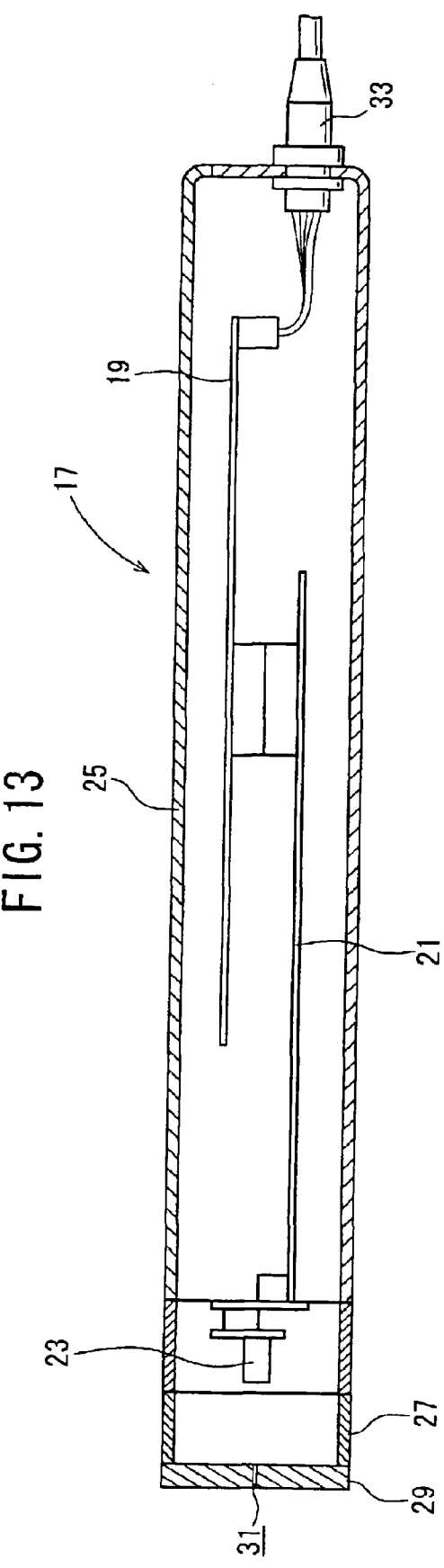
FIG. 13 is a longitudinal sectional view of the gamma camera apparatus having the one-dimensional array of semiconductor detecting elements.

FIGS. 11 through 13 show a gamma camera 17 having a one-dimensional array of semiconductor detecting elements. The gamma camera 17 has a casing 25 in the shape of a rectangular parallelepiped. The casing 25 houses circuit boards 19, 21 each with a signal processing circuit mounted thereon and also houses the one-dimensional array of semiconductor detecting elements 23 connected with the circuit boards 19, 21. A collimator 29 is disposed at one end of the casing 25 with a spacer 27. A plurality of openings 31 are defined in parallel to the one-dimensional array of semiconductor detecting elements 23. The openings 31 are disposed in a predetermined periodic pattern according to the M array. At the other end of the casing 25, a connector 33 is disposed for connecting the gamma camera 17 with the image reconstructing unit 18 (see FIG. 1). A switch 35 for starting the count of gamma rays with the gamma camera 17 and indicating lamps 37, 39 for showing working conditions of the gamma camera 17 are disposed in the vicinity of the connector 33. By means of the spacer 27, it is possible to adjust the distance between the collimator 29 and the one-dimensional array of semiconductor detecting elements 23 in the gamma camera 17.

The gamma rays emitted from the examinee 14 come into the one-dimensional array of semiconductor detecting elements 23 through the collimator 29, and are converted into electric signals. The converted signals are counted by the signal processing circuit on the circuit boards 19, 21. The counted value is sent to the image reconstructing unit 18 through the connector 33. The image reconstructing unit 18 reconstructs a sectional image of the examinee 14 on the display 22 based on the counted value.

Although certain preferred embodiments of the present invention have been shown and described in detail, it should be understood that various changes and modifications may be made therein without departing from the scope of the appended claims.

What is claimed is:

1. A gamma camera apparatus for detecting gamma rays emitted from a radioisotope administered to an examinee to construct a three-dimensional image representing a distribution of the radioisotope in the examinee, comprising:

detecting means for detecting gamma rays emitted from the radioisotope in the examinee;

an encoding aperture plate disposed between the examinee and said detecting means;

adjusting means for adjusting the distance from said detecting means to said encoding aperture plate to adjust the position of said encoding aperture plate depending on the depth of an observation position in the examinee; and processing means for reconstructing a three-dimensional image based on the gamma rays emitted from the radioisotope and detected by said detecting means through said encoding aperture plate, wherein said encoding aperture plate comprises an M-sequence collimator having a one-dimensional array of apertures over at least one period or an M-array collimator having a two-dimensional array of apertures over at least one period, and wherein an observation range for a detection plane of said detecting means in the examinee is at most $L \cdot (D+Z)/D$ where L represents the length of one period of said apertures, Z the distance from said collimator to the observation position in said examinee, and D the distance from said collimator to said detecting means.

2. A gamma camera apparatus according to claim 1, wherein said adjusting means comprises means for adjusting an enlargement ratio $\alpha$ of said encoding aperture plate with respect to said detecting means as viewed from said observation position in a range from 1.5 to 3.5.

3. A gamma camera apparatus according to claim 1, wherein said detecting means comprises a plurality of semiconductor detecting elements.

4. A gamma camera apparatus according to claim 3, wherein said semiconductor detecting elements are made of CdTe or CdZnTe.

5. A gamma camera apparatus according to claim 1, wherein said detecting means comprises a one-dimensional array of detecting elements.

6. A gamma camera apparatus according to claim 1, wherein said detecting means comprises a two-dimensional array of detecting elements.

7. A gamma camera apparatus according to claim 1, wherein said detecting means comprises a scintillator for converting the wavelength of gamma rays, and a position-sensitive photomultiplier for detecting light obtained by said scintillator.

8. A gamma camera apparatus according to claim 7, wherein said scintillator and said position-sensitive photomultiplier are interconnected by an optical fiber.

9. A gamma camera apparatus according to claim 7, wherein said scintillator is made of a material selected from the group consisting of NaI:Tl, CsI:Na, $LuSiO_5$:Ce(LSO), $(Lu_{1-x}Gd_x)SiO_5$:Ce (LGSO), and $YAlO_3$.

10. A gamma camera apparatus according to claim 1, wherein said detecting means comprises a scintillator for converting the wavelength of gamma rays, and a plurality of photodiodes for detecting light obtained by said scintillator.

11. A gamma camera apparatus according to claim 1, wherein said encoding aperture plate comprises a collimator having a one-dimensional array of apertures defined according to a rule of an M sequence.

12. A gamma camera apparatus according to claim 1, wherein said encoding aperture plate comprises a collimator having a two-dimensional array of apertures defined according to a rule of an M array.

13. A gamma camera apparatus according to claim 1, further comprising:

image display means for displaying the reconstructed three-dimensional image; and image supply means for supplying an image to be used in superposed relation to said reconstructed three-dimensional image.

14. A gamma camera apparatus according to claim 13, wherein said image supply means comprises a computerized tomography diagnostic device.

15. A gamma camera apparatus according to claim 13, wherein said image supply means comprises a nuclear medicine diagnostic device.

16. A gamma camera apparatus according to claim 13, wherein said image supply means comprises a magnetic resonance diagnostic device.

17. A gamma camera apparatus according to claim 13, wherein said image supply means comprises a digital camera device.

* * * * *